(12) United States Patent
Son et al.

(10) Patent No.: US 7,593,455 B2
(45) Date of Patent: Sep. 22, 2009

(54) TERMINAL FOR PERFORMING WAKE-UP WITH CONSUMPTION OF LOW POWER AND WAKE-UP METHOD THEREOF

(75) Inventors: Mi-hyun Son, Seoul (KR); Sato Takahiro, Yokohama (JP); Haruyama Shinichi, Yokohama (JP); Young-hwan Kim, Hwaseong-si (KR); Kwy-ro Lee, Daejeon (KR); Seong-soo Lee, Suwon-si (KR); Hak-sun Kim, Daejeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 602 days.

(21) Appl. No.: 11/339,494

(22) Filed: Jan. 26, 2006

(65) Prior Publication Data

US 2006/0176837 A1     Aug. 10, 2006

(30) Foreign Application Priority Data

Feb. 4, 2005    (KR) ...................... 10-2005-0010704

(51) Int. Cl.
     *H04B 1/00*      (2006.01)
(52) U.S. Cl. ........................ 375/150; 142/143; 142/152; 142/316; 142/343
(58) Field of Classification Search ................. 375/150, 375/142, 143, 152, 316, 343
See application file for complete search history.

(56) References Cited

U.S. PATENT DOCUMENTS 4,017,798 A * 4/1977 Gordy et al. ................. 375/332
7,155,263 B1 * 12/2006 Bergamo ..................... 455/574

FOREIGN PATENT DOCUMENTS

KR    2001-0021100 A    3/2001
KR    2002-7002494 A    4/2002

* cited by examiner

*Primary Examiner*—Ted Wang
(74) *Attorney, Agent, or Firm*—Sughrue Mion, PLLC

(57) ABSTRACT

Provided are a terminal performing a wake-up with consumption of low power and a wake-up method performed by the terminal. The terminal includes: a passive filter outputting a correlation signal between a received signal and a reference signal; and a wake-up controller controlling whether to wake up a communication module, using the correlation signal output from the passive filter. Thus, a wake-up signal can be processed using the passive element that does not consume power during its operation. Also, a wake-up of a communication module can be controlled using the result of processing the wake-up signal. As a result, power consumption can be greatly reduced during the wake-up.

14 Claims, 5 Drawing Sheets

TERMINAL FOR PERFORMING WAKE-UP WITH CONSUMPTION OF LOW POWER AND WAKE-UP METHOD THEREOF

CROSS-REFERENCE TO RELATED APPLICATIONS

This application claims the benefit of Korean Patent Application No. 2005-10704, filed Feb. 4, 2005, in the Korean Intellectual Property Office, the disclosure of which is incorporated herein by reference.

BACKGROUND OF THE INVENTION

1. Field of the Invention

The present invention relates to a terminal and a wake-up method thereof, and more particularly, to a terminal constituting a wireless network and consuming a low power during a wake-up and a wake-up method thereof.

2. Description of the Related Art

Terminals constituting wireless networks are supplied with power via batteries. Since capacities of the batteries have been limited, it is most important to design the terminals so as to consume less power.

An example of a module of such a terminal consuming a large amount of power is a communication module transmitting a radio frequency (RF) signal to and/or receiving an RF signal from external terminals. Thus, a method by which power is supplied to the communication module only if necessary is generally used.

A state of not supplying power to the communication module is referred to as a sleep state, while a state of supplying power to the communication module is referred to as a wake-up state. The communication module may transmit and/or receive the RF signal only in the wake-up state.

In most cases, a conversion of a state of the communication module into the sleep/wake-up state is set to be periodically performed. However, in a preferred conversion into the sleep/wake-up state, i.e., in a conversion into the sleep/wake-up state reducing power consumption, the communication module is woken up only when the communication module receives a wake-up signal from an external terminal, for example a master.

In the latter case, the terminal must additionally include a module (hereinafter, referred to as a wake-up signal detecting module) detecting whether a wake-up signal thereof has been received.

Active elements that consume power during detections as to whether their wake-up signals have been received have been used as wake-up signal detecting modules. Thus, the wake-up signal modules consume large amounts of power to detect their wake-up signals.

SUMMARY OF THE INVENTION

Accordingly, the present general inventive concept has been made to address the above-mentioned and/or problems, and an aspect of the present general inventive concept is to provide a terminal processing a wake-up signal using a passive element such as a surface acoustic wave (SAW) matched filter not consuming power so as to reduce an amount of power consumed during a wake-up and a wake-up method thereof.

According to an aspect of the present invention, there is provided a terminal constituting a wireless network, including: a passive filter outputting a correlation signal between a received signal and a reference signal; and a wake-up controller controlling whether to wake up a communication module, using the correlation signal output from the passive filter.

The passive filter may be a surface acoustic wave matched filter.

The received signal may be a spreading signal spread to a predetermined pseudo noise code, and the surface acoustic wave matched filter may despread the spreading signal to generate a despreading signal and integrate the despreading signal to output the correlation signal.

The wake-up controller may include: an envelope detector detecting and outputting an envelope signal of the correlation signal output from the surface acoustic wave matched filter; and a comparator comparing a level of the envelope signal output from the envelope detector with a predetermined reference level to determine whether to wake up the communication module.

The wake-up controller may include: an envelope detector detecting and outputting an envelope signal of the correlation signal output from the surface acoustic wave matched filter; an amplifier amplifying and outputting the envelope signal output from the envelope detector; and a comparator comparing a level of the amplified envelope signal output from the amplifier with a predetermined reference level to determine whether to wake up the communication module.

The wake-up controller may include: an envelope detector detecting and outputting an envelope signal of the correlation signal output from the surface acoustic wave matched filter; a transformer boosting and outputting the envelope signal output from the envelope detector; and a comparator comparing a level of the boosted envelope signal output from the transformer with a predetermined reference level to determine whether to wake up the communication module.

If the communication module is woken up, the communication module may generate a wake-up delivery signal and transmit the wake-up delivery signal to an external terminal.

The wireless network may be, for example, a wireless local area network, a wireless personal area network, or a wireless metropolitan area network.

According to another aspect of the present invention, there is provided a wake-up method performed by a terminal constituting a wireless network, including: outputting a correlation signal between a received signal and a reference signal using a passive filter; and controlling whether to wake up a communication module using the correlation signal output from the passive filter.

The correlation signal between the received signal and the reference signal may be output using a surface acoustic wave matched filter.

The received signal may be a spreading signal spread to a predetermined pseudo noise code, and the spreading signal may be despread to generate a despreading signal and the despreading signal may be integrated to output the correlation signal using the surface acoustic wave matched filter.

Controlling to wake up the communication module using the correlation signal output from the passive filter may include: detecting and outputting an envelope signal of the correlation signal output from the surface acoustic wave matched filter; and comparing a level of the output envelope signal with a predetermined reference level to determine whether to wake up the communication module.

Controlling to wake up the communication module using the correlation signal output from the passive filter may include: detecting and outputting an envelope signal of the correlation signal output from the surface acoustic wave matched filter; amplifying and outputting the envelope signal; and comparing a level of the amplified envelope signal with a predetermined reference level to determine whether to wake up the communication module.

Controlling to wake up the communication module using the correlation signal output from the passive filter may include: detecting and outputting an envelope signal of the correlation signal output from the surface acoustic wave matched filter; boosting and outputting the output envelope signal; and comparing a level of the boosted envelope signal with a predetermined reference level to determine whether to wake up the communication module.

The wake-up method may further include: if the communication module is woken up, generating a wake-up delivery signal and transmitting the wake-up delivery signal to an external terminal.

The wireless network may be a wireless local area network, a wireless personal area network, or a wireless metropolitan area network.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE EXEMPLARY EMBODIMENTS

Figure 1:
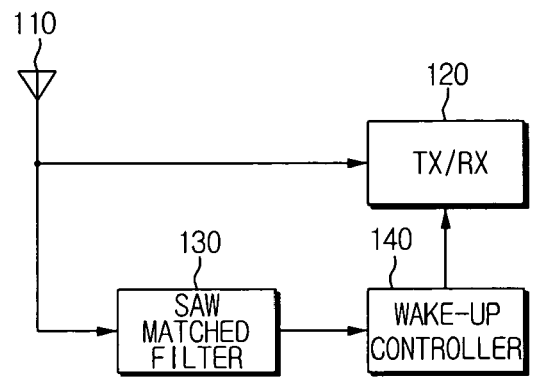
FIG. 1 is a block diagram of a terminal performing a wake-up with consumption of a low power according to an embodiment of the present invention.

Certain embodiments of the present invention will be described in greater detail with reference to the accompanying drawings.

In the following description, the same drawing reference numerals are used for the same elements even in different drawings. The matters defined in the description such as a detailed construction and elements are merely provided to assist in a comprehensive understanding of the invention. Thus, it is apparent that the present invention can be carried out without those defined matters. Also, well-known functions or constructions are not described in detail since that would obscure the invention in unnecessary detail.

FIG. 1 is a block diagram of a terminal according to an embodiment of the present invention. The present terminal is a terminal constituting a wireless network and may perform a wake-up while consuming little power.

Referring to FIG. 1, the terminal includes an antenna 110, a TX/RX 120, a SAW matched filter 130, and a wake-up controller 140.

The TX/RX 120 is a communication module communicating with another terminal existing on a wireless network. In other words, the TX/RX 120 transmits an RF signal through the antenna 110 to another terminal on the wireless network or receives the RF signal through the antenna 110 from the other terminal.

The TX/RX 120 is in a sleep state in ordinary times. If the TX/RX 120 converts from the sleep state into a wake-up state, the TX/RX 120 performs the transmission and/or reception of the RF signal that is its original function. The TX/RX 120 is woken up by a control of the wake-up controller 140 that will be described later.

The SAW matched filter 130 outputs a correlation signal between the RF signal received through the antenna 110 and a predetermined reference signal. In detail, the SAW matched filter 130 despreads the RF signal that has been spread to a predetermined pseudo noise (PN) code to generate a despreading signal and integrates the dispreading signal to output the correlation signal.

The SAW matched filter 130 is a passive filter and does not consume power during operation thereof. The SAW matched filter 130 will be described in detail later.

The wake-up controller 140 controls whether to wake up the TX/RX 120, using the correlation signal output from the SAW matched filter 130.

In detail, if a level of the correlation signal output from the SAW matched filter 130 exceeds a predetermined reference level, the wake-up controller 140 controls the TX/RX 120 to be woken up. Since the RF signal received by the SAW matched filter 130 corresponds to a wake-up signal of the present terminal, the level of the correlation signal output from the SAW matched filter 130 exceeds the predetermined reference level.

If the level of the correlation signal output from the SAW matched filter 130 is less than or equal to the predetermined reference level, the wake-up controller 140 controls the TX/RX 120 to remain in the sleep state. Since the RF signal received by the SAW matched filter 130 does not correspond to the wake-up signal of the present terminal, the level of the correlation signal output from the SAW matched filter 130 is less than or equal to the predetermined level.

The wake-up controller 140 may be realized in various forms that will be described in more detail later.

Figure 2A:
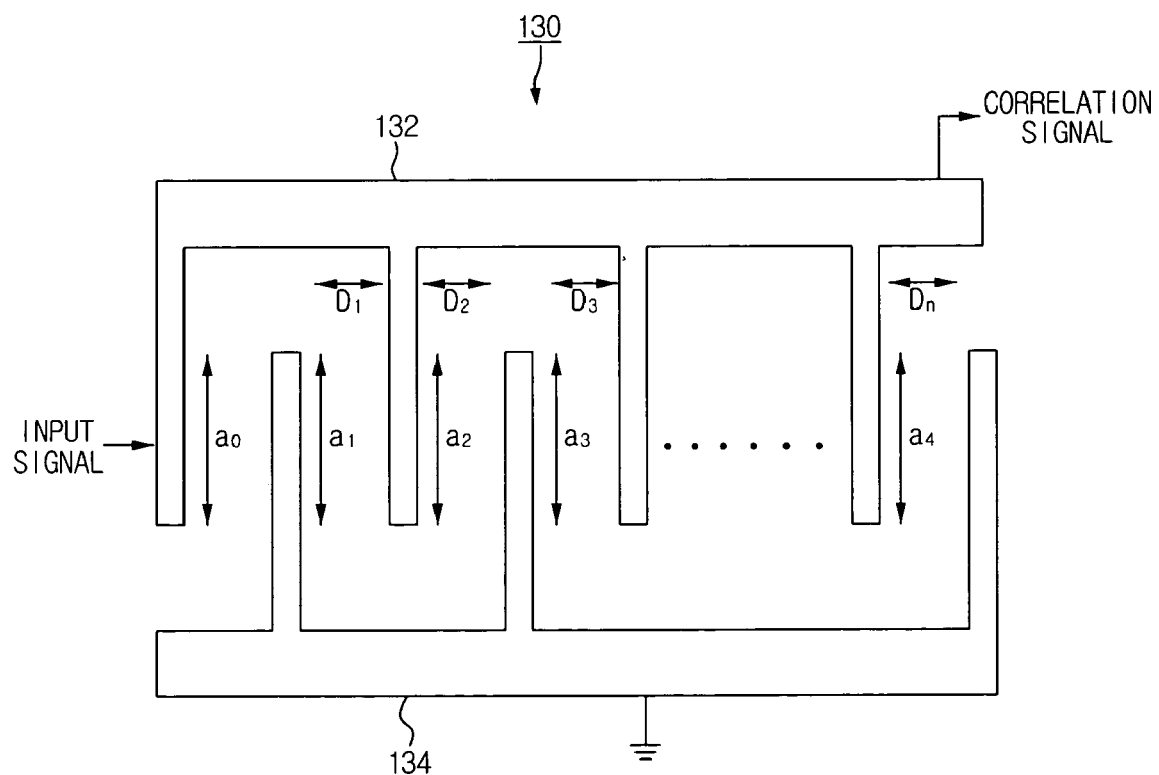
FIG. 2A is a view illustrating a SAW matched filter.
Figure 2B:
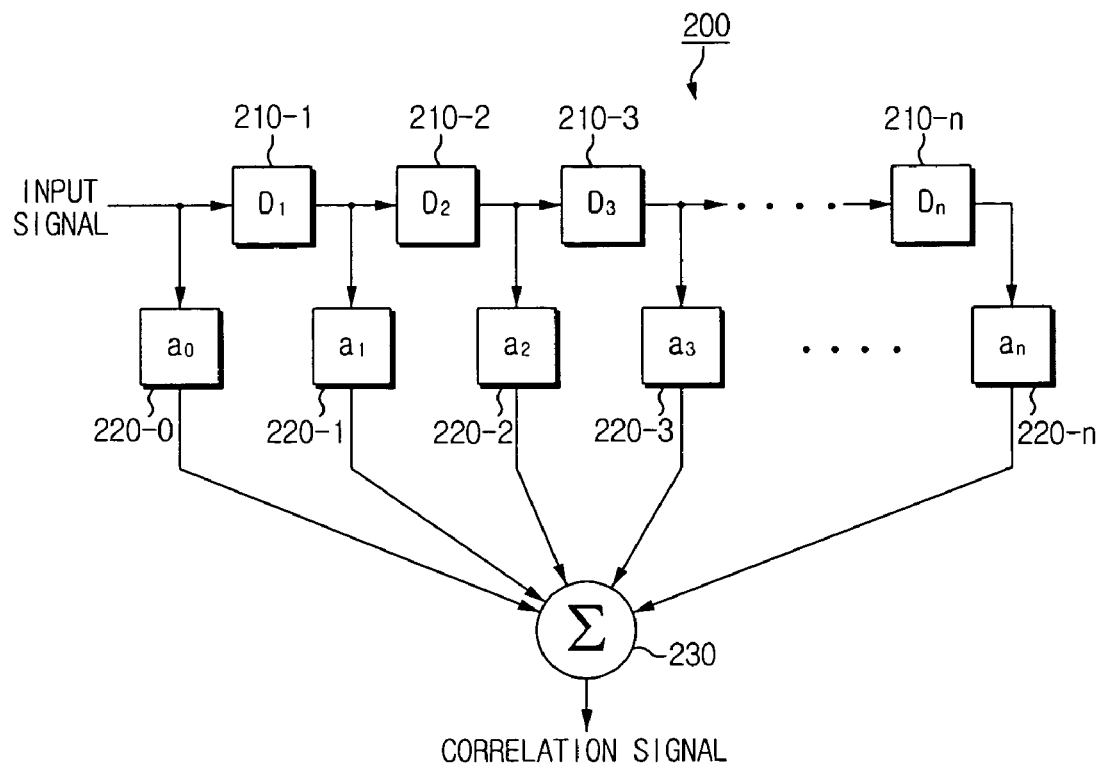
FIG. 2B is a view illustrating a transversal filter equivalent to the SAW matched filter.

The SAW matched filter 130 will now be described in more detail with reference to FIGS. 2A and 2B. FIG. 2A is a view illustrating the SAW matched filter 130, and FIG. 2B is a view illustrating a transversal filter equivalent to the SAW matched filter 130.

A transversal filter 200 equivalent to the SAW matched filter 130 will be described with reference to FIG. 2B. The transversal filter 200 multiplies input bits constituting an input signal by filtering coefficients corresponding to the input bits, and sums and outputs the multiplication values.

The transversal filter 200 includes first through $n^{th}$ buffers 210-1 through 210-n, and $0^{th}$ through $n^{th}$ multipliers 220-0 through 220-n, and an adder 230. The first through $n^{th}$ buffers 210-1 through 210-n delay and buffer the input bits constituting the input signal sequentially according to an input order of the input bits. The $0^{th}$ through $n^{th}$ multipliers 220-0 through 220-n multiply a currently input bit and the input bits buffered by the first through $n^{th}$ buffers 210-1 through 210-n by filtering coefficients $a_0$ through $a_n$, respectively, and output the multiplication values to the adder 230. The adder 230 sums and outputs the multiplication values output from the $0^{th}$ through $n^{th}$ multipliers 220-0 through 220-n.

If the input signal is the spreading signal and a signal sequence "$a_0, a_1, a_2, a_3, \ldots,$ and $a_n$" is the PN code, the transversal filter 200 may be a filter that despreads the spreading signal to generate the despreading signal and integrates the despreading signal to output the correlation signal.

The transversal filter 200 may be a filter outputting the correlation signal between the input signal and the reference signal. Here, the reference signal is the signal sequence formed of "$a_0, a_1, a_2, a_3, \ldots$, and $a_n$."

The SAW matched filter 130 shown in FIG. 2A is designed so as to operate in the same way as the transversal filter 200. As shown in FIG. 2A, the SAW matched filter 130 may be realized using output and ground electrodes 132 and 134 having comb structures.

In detail, the first through $n^{th}$ buffers 210-1 through 210-n of the transversal filter 200 delay the input bits according to distances "$D_1, D_2, D_3, \ldots$, and $D_n$" between the output and ground electrodes 132 and 134 of the SAW matched filter 130.

The $0^{th}$ through $n^{th}$ multipliers 220-0 through 220-n of the transversal filter 200 multiply the input bits buffered by the filtering coefficients $a_0$ through $a_n$ according to overlaps "$a_0, a_1, a_2, a_3, \ldots$, and $a_n$" between the output and ground electrodes 132 and 134 of the SAW matched filter 130.

The adder 230 of the transversal filter 200 sums and outputs the multiplication values according to summing and outputting of multiplication values performed by the output electrode 132 of the SAW matched filter 130.

Accordingly, the SAW matched filter 130 shown in FIG. 2A may perform an equivalent operation to the transversal filter 200.

If the input signal is the spreading signal and the signal sequence "$a_0, a_1, a_2, a_3, \ldots$, and $a_n$" is the PN code, the SAW matched filter 130 despreads the spreading signal to generate the despreading signal and integrates the despreading signal to output the correlation signal.

Thus, if the input signal input to the SAW matched filter 130 is the spreading signal spread to the signal sequence "$a_0, a_1, a_2, a_3, \ldots$, and $a_n$," the level of the correlation signal output from the SAW matched filter 130 exceeds the predetermined reference level.

Also, the SAW matched filter 130 may be a filter outputting the correlation signal between the input signal and the reference signal. Here, the reference signal is the signal sequence "$a_0, a_1, a_2, a_3, \ldots$, and $a_n$."

The wake-up controller 140 will now be described in more detail. As previously described, the wake-up controller 140 controls whether to wake up the TX/RX 120, using the correlation signal output from the SAW matched filter 130.

Figure 3A:
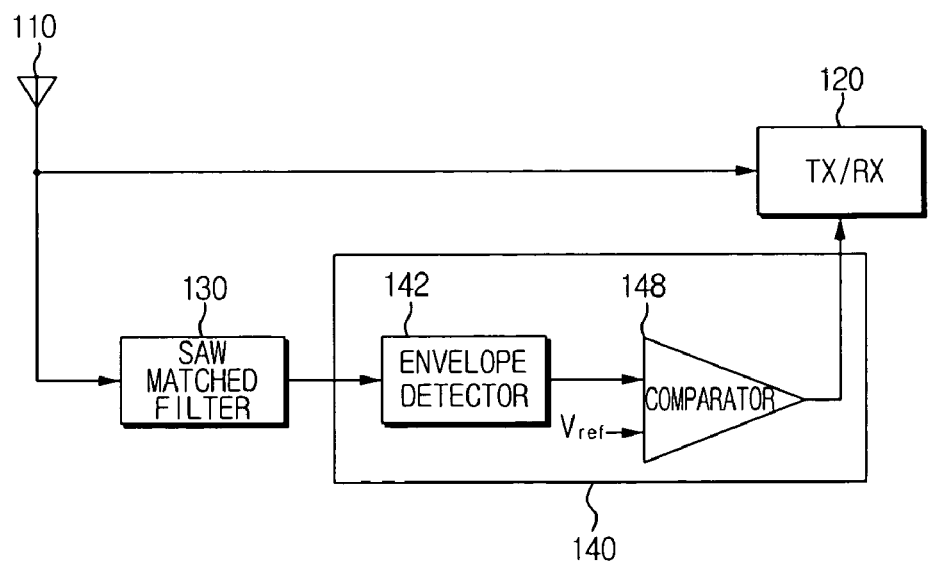
FIG. 3A is a block diagram illustrating a wake-up controller according to an embodiment of the present invention.

FIG. 3A illustrates an example of the wake-up controller 140 performing such a function. As shown in FIG. 3A, the wake-up controller 140 includes an envelope detector 142 and a comparator 148.

The envelope detector 142 detects an envelope signal of the correlation signal output from the SAW matched filter 130. The envelope detector 142 outputs the envelope signal of the correlation signal (hereinafter, referred to as an envelope signal) to the comparator 148.

The comparator 148 compares a level of the envelope signal output from the envelope detector 142 with a predetermined reference level $V_{ref}$ to determine whether to wake up the TX/RX 120. In detail, if the level of the envelope signal exceeds the predetermined reference level $V_{ref}$, the comparator 148 may output a signal on a logic level "high" to the TX/RX 120 to command the TX/RX 120 to be woken up. As a result, the TX/RX 120 converts from the sleep state into the wake-up state.

If the level of the envelope signal is less than or equal to the predetermined reference level $V_{ref}$, the comparator 148 may output a signal on a logic level "low" to the TX/RX 120 to command the TX/RX 120 to remain in the sleep state. As a result, the TX/RX 120 remains in the sleep state.

Figure 3B:
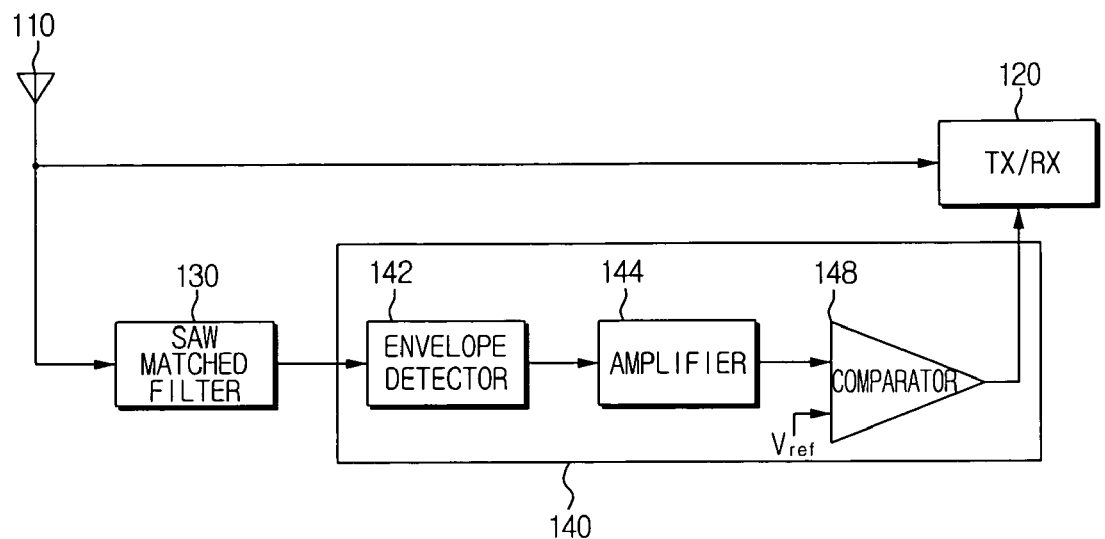
FIG. 3B is a block diagram illustrating a wake-up controller according to another embodiment of the present invention.

The wake-up controller 140 may be realized as shown in FIG. 3B. As shown in FIG. 3B, the wake-up controller 140 includes an envelope detector 142, an amplifier 144, and a comparator 148.

The wake-up controller 140 shown in FIG. 3B is the same as the wake-up controller 140 shown in FIG. 3A except that the wake-up controller 140 further includes the amplifier 144.

The amplifier 144 amplifies the envelope signal output from the envelope detector 142 to a predetermined gain and outputs the amplified envelope signal to the comparator 148.

If the amplifier 144 is inserted between the envelope detector 142 and the comparator 148 as shown in FIG. 3B, the wake-up controller 140 may effectively cope with a faint envelope signal.

Figure 3C:
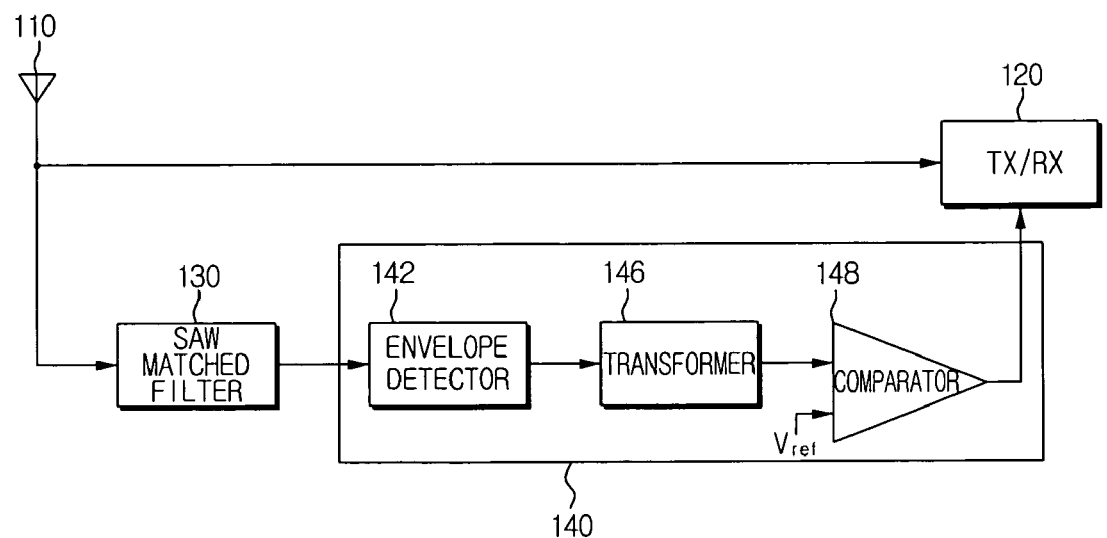
FIG. 3C is a block diagram illustrating a wake-up controller according to still another embodiment of the present invention.

The wake-up controller 140 may also be realized as shown in FIG. 3C. As shown in FIG. 3C, the wake-up controller 140 includes an envelope detector 142, a transformer 146, and a comparator 148.

The wake-up controller 140 shown in FIG. 3C is the same as the wake-up controller 140 shown in FIG. 3B except that the transformer 146 instead of the amplifier 144 is inserted between the envelope detector 142 and the comparator 148.

The transformer 146 performs the same function as the amplifier 144 shown in FIG. 3B. In other words, the transformer 146 boosts the envelope signal detected by the envelope detector 142 in a predetermined ratio and outputs the boosted envelope signal to the comparator 148.

If the transformer 146 is inserted between the envelope detector 142 and the comparator 148 as shown in FIG. 3C, the wake-up controller 140 may further effectively cope with a faint envelope signal as when the amplifier 144 is inserted between the envelope detector 142 and the comparator 148.

When the TX/RX 120 is woken up, the TX/RX 120 generates a wake-up delivery signal. The TX/RX 120 transmits the wake-up delivery signal to other terminals existing on the wireless network. In other words, when the present terminal is woken up, the present terminal wakes up peripheral terminals.

Figure 4:
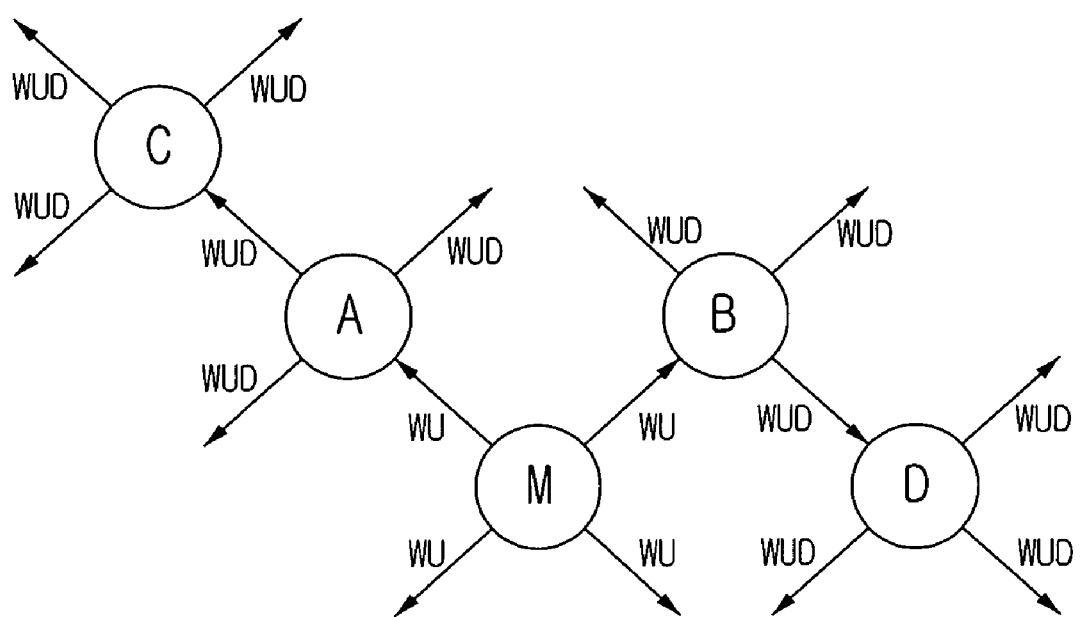
FIG. 4 is a view illustrating a process of waking up terminals existing on a wireless network.

FIG. 4 illustrates a process of waking up terminals existing on a wireless network according to the above-described process. As shown in FIG. 4, TX/RXs of terminals A and B that are woken up by receiving a wake-up signal WU from a master M generate wake-up delivery signals WUD and respectively transmit the wake-up delivery signal WUD to terminals C and D existing on the wireless network.

As a result, the terminals C and D that have received the wake-up delivery signals WUD from the terminals A and B are woken up. TX/RXs of the terminals C and D generate wake-up delivery signals WUD and transmit the wake-up delivery signals WUD to other terminals existing on the wireless network.

If a relay-type wake-up is applied as shown in FIG. 4, the master M does not need to directly transmit wake-up signals WU for waking up remote terminals. As a result, an amount of power consumed for transmitting the wake-up signals WU can be greatly reduced.

Figure 5:
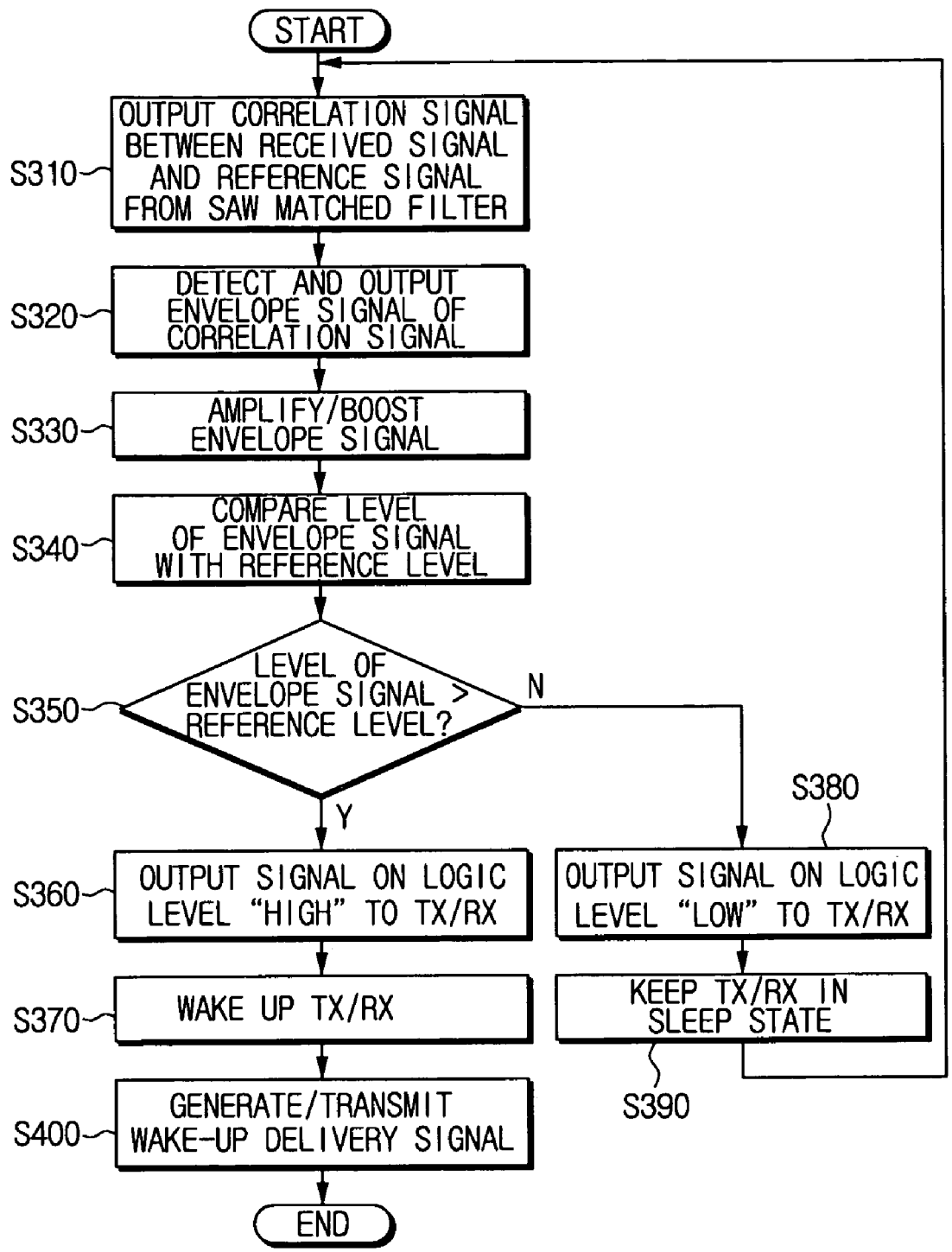
FIG. 5 is a flowchart of a wake-up method with consumption of a low power according to an embodiment of the present invention.

A process of performing a wake-up with consumption of low power using the present terminal will now be described in detail with reference to FIG. 5. FIG. 5 is a flowchart of a wake-up method with consumption of low power according to an embodiment of the present invention.

In operation S310, the SAW matched filter 130 outputs a correlation signal between an RF signal received through the antenna 110 and a predetermined reference signal.

In detail, the SAW matched filter 130 despreads the RF signal spread to a predetermined PN code to generate a despreading signal and integrates the despreading signal to output the correlation signal. If the RF signal received by the SAW matched filter 130 is the spreading signal spread to the predetermined PN code, a level of the correlation signal output from the SAW matched filter 130 exceeds a predetermined reference level.

Since the SAW matched filter 130 is a passive filter, power is not consumed during the performance of operation S310.

In operations S320 through S390, the wake-up controller 140 controls whether to wake up the TX/RX 120, using the correlation signal output from the SAW matched filter 130.

In detail, if the level of the correlation signal output from the SAW matched filter 130 exceeds the predetermined reference level, the wake-up controller 140 controls the TX/RX 120 to be woken up. If the level of the correlation signal output from the SAW matched filter 130 is less than or equal to the predetermined reference level, the wake-up controller 140 controls the TX/RX 120 to remain in a sleep state.

Operations S320 through S390 will now be described in more detail.

In operation S320, the envelope detector 142 detects and outputs an envelope signal of the correlation signal output from the SAW matched filter 130.

In operation S330, the amplifier 144/transformer 146 amplifies/boosts and outputs the envelope signal output from the envelope detector 142 in a predetermined gain/ratio.

Operation S330 is slightly differently realized depending on a structure of the wake-up controller 140. In other words, if the wake-up controller 140 includes the amplifier 144 as shown in FIG. 3B, operation S330 may be realized as an operation in which the amplifier 144 amplifies the envelope signal. If the wake-up controller 140 includes the transformer 146 as shown in FIG. 3C, operation S330 may be realized as an operation in which the transformer 146 boosts the envelope signal.

If the wake-up controller 140 does not include the amplifier 144 and the transformer 146 as shown in FIG. 3A, operation S330 may not be performed.

In operation S340, the comparator 148 compares the level of the envelope signal with a predetermined reference level $V_{ref}$.

If the level of the envelope signal exceeds the predetermined reference level $V_{ref}$ in operation S350, the comparator 148 outputs a signal on a logic level "high" to the TX/RX 120 in operation S360. In operation S370, the TX/RX 120 that has received the signal on the logic level "high" is changed from the sleep state into a wake-up state.

If the level of the envelope signal is less than or equal to the predetermined reference level $V_{ref}$ in operation S350, the comparator 148 outputs a signal on a logic level "low" to the TX/RX 120 in operation S380. In operation S390, the TX/RX 120 that has received the signal on the logic level "low" remains in the sleep state.

If the TX/RX 120 is woken up, the TX/RX 120 generates a wake-up delivery signal and transmits the wake-up delivery signal to other terminals existing on the wireless network in operation S400. In other words, when the present terminal is woken up, the present terminal wakes up other terminals existing on the wireless network.

The terminal performing the wake-up with consumption of low power and the wake-up method thereof have been described in detail. The kinds of wireless networks to which the present invention may be applied may not be limited. In other words, the present invention may be applied to a wireless local area network (WLAN), a wireless personal area network (WPAN), a wireless metropolitan area network (WMAN), or the like.

As described above, in a terminal performing a wake-up with consumption of low power and a wake-up method thereof according to the present invention, a wake-up signal can be processed using a passive element such as a SAW matched filter. A wake-up of a communication module can be controlled using the result of processing the wake-up signal. Since the passive element does not consume power to process a signal, power consumption can be reduced during the wake-up. As a result, the terminal can operate for a longer period of time.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A terminal constituting a wireless network, comprising:
a passive filter outputting a correlation signal indicating correlation between a received signal and a reference signal; and
a wake-up controller controlling whether to wake up a communication module, using the correlation signal output from the passive filter, wherein the wake-up controller comprises:
an envelope detector detecting and outputting an envelope signal of the correlation signal output from the surface acoustic wave matched filter; and
a comparator comparing a level of the envelope signal output from the envelope detector with a predetermined reference level to determine whether to wake up the communication module.

2. The terminal of claim 1, wherein the passive filter is a surface acoustic wave matched filter.

3. The terminal of claim 2, wherein:
the received signal is a spreading signal spread to a predetermined pseudo noise code; and
the surface acoustic wave matched filter despreads the spreading signal to generate a despreading signal and integrates the despreading signal to output the correlation signal.

4. The terminal of claim 2, wherein the wake-up controller comprises:
an envelope detector detecting and outputting an envelope signal of the correlation signal output from the surface acoustic wave matched filter;
an amplifier amplifying and outputting the envelope signal output from the envelope detector; and
a comparator comparing a level of the amplified envelope signal output from the amplifier with a predetermined reference level to determine whether to wake up the communication module.

5. The terminal of claim 2, wherein the wake-up controller comprises:
an envelope detector detecting and outputting an envelope signal of the correlation signal output from the surface acoustic wave matched filter;
a transformer boosting and outputting the envelope signal output from the envelope detector; and a comparator comparing a level of the boosted envelope signal output from the transformer with a predetermined reference level to determine whether to wake up the communication module.

6. The terminal of claim 2, wherein if the communication module is woken up, the communication module generates a wake-up delivery signal and transmits the wake-up delivery signal to an external terminal.

7. The terminal of claim 2, wherein the wireless network is one of a wireless local area network, a wireless personal area network, and a wireless metropolitan area network.

8. A wake-up method performed by a terminal constituting a wireless network, comprising:
   outputting a correlation signal indicating correlation between a received signal and a reference signal using a passive filter; and
   controlling whether to wake up a communication module using the correlation signal output from the passive filter,
   wherein controlling to wake up the communication module using the correlation signal output from the passive filter comprises:
   detecting and outputting an envelope signal of the correlation signal output from the surface acoustic wave matched filter; and
   comparing a level of the output envelope signal with a predetermined reference level to determine whether to wake up the communication module.

9. The wake-up method of claim 8, wherein the correlation signal between the received signal and the reference signal is output using a surface acoustic wave matched filter.

10. The wake-up method of claim 9, wherein the received signal is a spreading signal spread to a predetermined pseudo noise code, and the method further comprises despreading the spreading signal to generate a despreading signal and integrating the despreading signal to output the correlation signal using the surface acoustic wave matched filter.

11. The wake-up method of claim 9, wherein controlling to wake up the communication module using the correlation signal output from the passive filter comprises:
   detecting and outputting an envelope signal of the correlation signal output from the surface acoustic wave matched filter;
   amplifying and outputting the envelope signal; and
   comparing a level of the amplified envelope signal with a predetermined reference level to determine whether to wake up the communication module.

12. The wake-up method of claim 9, wherein controlling whether to wake up the communication module using the correlation signal output from the passive filter comprises:
   detecting and outputting an envelope signal of the correlation signal output from the surface acoustic wave matched filter;
   boosting and outputting the output envelope signal; and
   comparing a level of the boosted envelope signal with a predetermined reference level to determine whether to wake up the communication module.

13. The wake-up method of claim 9, further comprising:
   if the communication module is woken up, generating a wake-up delivery signal and transmitting the wake-up delivery signal to an external terminal.

14. The wake-up method of claim 9, wherein the wireless network is one of a wireless local area network, a wireless personal area network, and a wireless metropolitan area network.

* * * * *